July 26, 1966 W. H. SWAIN 3,263,187

FREQUENCY MODULATOR WITH BLOCKING OSCILLATOR

Filed Aug. 25, 1960 2 Sheets-Sheet 1

William H. Swain
INVENTOR.

BY William R. Sherman

ATTORNEY

William H. Swain
INVENTOR.
BY William R. Sherman
ATTORNEY

United States Patent Office 3,263,187
Patented July 26, 1966

3,263,187
FREQUENCY MODULATOR WITH BLOCKING OSCILLATOR

William H. Swain, Sarasota, Fla., assignor to Electro-Mechanical Research, Inc., Sarasota, Fla., a corporation of Connecticut Filed Aug. 25, 1960, Ser. No. 51,938
2 Claims. (Cl. 332—16)

Figure 1:
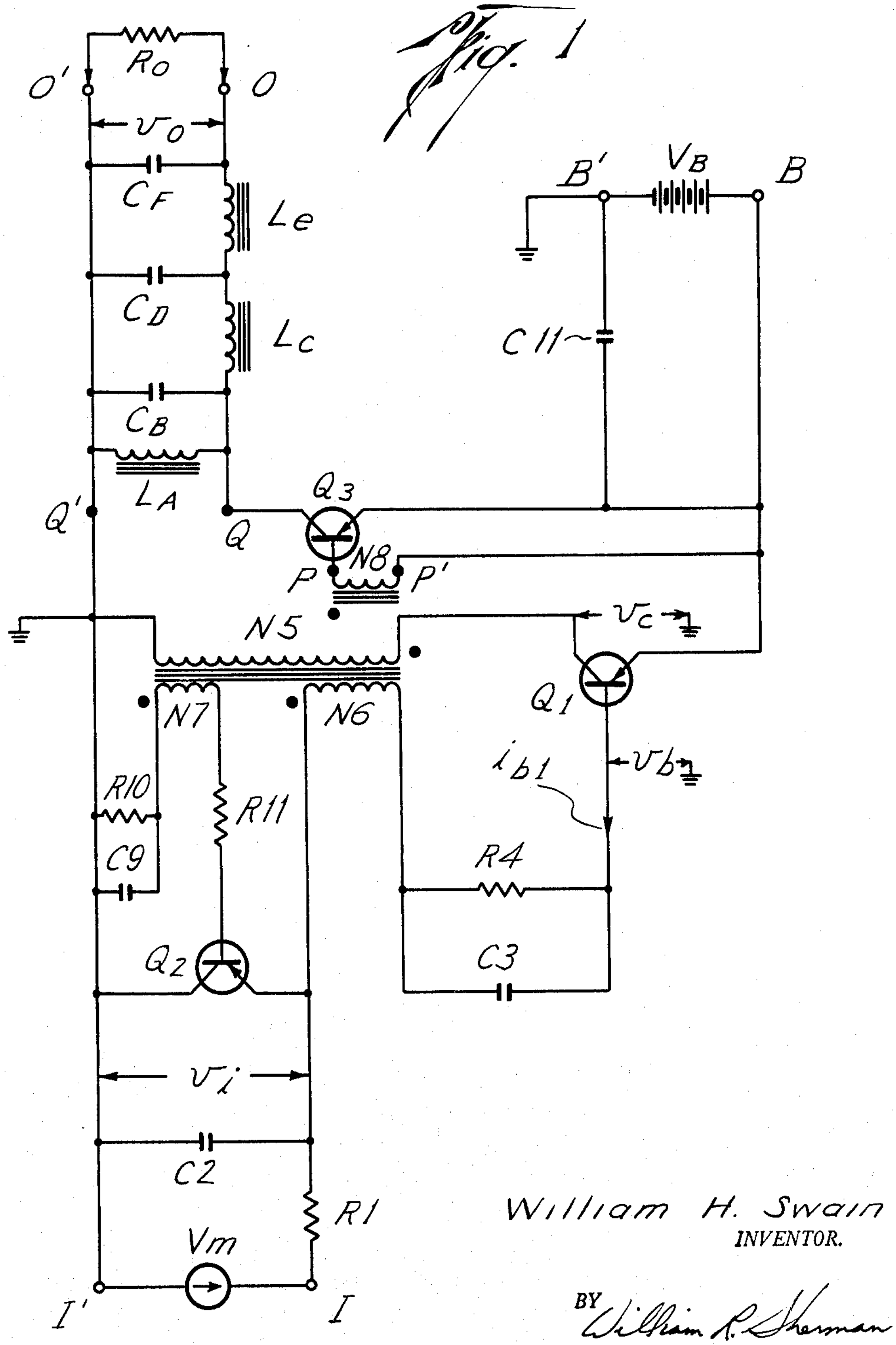

This invention relates to variable frequency signal generators and, more particularly, to such generators whose frequency is linearly varied by incoming intelligence signals.

In the rapidly developing art of telemetering systems associated with guided missiles, pilotless aircraft or projectiles, for example, automatic measurement instruments are provided for recording changing physical, electrical and magnetic phenomena. In such systems, means are usually provided for converting the variable phenomena into corresponding electrical intelligence signals. These signals are then used to linearly modulate the frequency of a local sub-carrier oscillator. The frequency modulated signals from a plurality of such sub-carrier oscillators are then fed to a main carrier modulator network of a radio transmitter energizing an outside antenna.

Receiver means at a remote point, either on ground or elsewhere, pick up the transmitted frequency modulated composite carrier wave and convert it into a main sub-carrier signal from which the component F-M modulated sub-carrier signals are filtered out. Finally, frequency discriminator circuits extract from the F-M sub-carrier signal the input intelligence signal.

Although various voltage controlled oscillators (hereinafter referred to as VCO) are already known in the art, they possess certain inherent disadvantages which prevent their use in the latest subminiaturized equipments, operating under severe environmental conditions.

Accordingly, my invention is primarily concerned with the provision of a VCO which uses a minimum numebr of components which can be housed in a very small volume, which is especially suitable for printed circuit techniques and which consumes very little power. This is accomplished by utilizing miniature components some of which perform several functions during a single period of operation of the sub-carrier oscillator.

It is therefore an object of the present invention to provide new and improved subminiature frequency modulation systems which are very stable and whose frequency deviation is linearly proportional over a wide range of the magnitude of the randomly incoming modulating signals.

Another object of my invention is to provide systems of the foregoing character in which extremely small incoming modulating signals produce wide frequency deviations.

A further object of this invention is to provide such frequency modulation systems which are essentially insensitive, over a wide operating range, to changes in environmental conditions such as temperature, pressure, shock and vibration, and to acoustic or electric field noise.

Yet a still further object of this invention is to provide a modulation system having a linear frequency deviation response to D.-C. as well as to rapidly changing intelligence signals.

Another object of this invention is to provide in systems of the foregoing character a stable periodic pulse generator, the interpulse period of which may be shifted by a small voltage or current.

Further objects and advantages of my invention will become apparent as the following description proceeds and the features of novelty which characterize my invention will be pointed out with particularity in the claims annexed to and forming part of this invention.

In accordance with this invention, an oscillator or periodic pulse generator is coupled to a modulator circuit for deviating the frequency of oscillation of the oscillator or the pulse repetition rate of the pulse generator. If it is desired to have a sub-carrier sine wave, the pulses, after being amplified, may be applied to a special band pass filter. The preferred embodiment of my invention utilizes a transistorized blocking oscillator having a parallel resistor-capacitor timing network and a pulse transformer with a plurality of inductively coupled windings mounted on a small high permeability core. The modulating network includes a transistorized chopper. The intelligence signals are applied directly to the chopper or through an integrating network.

The charge on the timing capacitor may be dissipated through the timing resistor without flowing to ground or through any intelligence receiving input circuits, thereby making the oscillator (or periodic pulse generator) appear as a passive impedance load to the input circuit. Thus, the oscillator or pulse generator becomes isolated from the signal source and does not feedback thereto any voltage or current.

The feedback winding of the precision blocking oscillator is connected to the output terminal of the chopper, the time operation of which is determined by a control winding. While the modulating signals bias the R-C timing circuit only during the relaxation period of each cycle thereby determining the interpulse repetition frequency, they are solidly chopped to ground during the main pulse of the oscillator. If desired, the main pulse of the blocking oscillator after being amplified, may be applied to a band pass filter thereby producing a sine wave whose frequency corresponds to the interpulse repetition frequency.

The invention will be better understood from the following detailed description taken in conjunction with the accompanying drawings in which:

FIG. 1 is a schematic diagram of a frequency modulation system in accordance with my invention; and FIGS. 2A, 2B, 2C and 2D show four voltage wave forms as a function of time at critical points of the modulation system.

In FIG. 1 is shown a frequency modulation system comprising a first transistor $Q_1$ in the tunable blocking oscillator circuit, a second transistor $Q_2$ in the chopper circuit and a third transistor $Q_3$ in the pulse amplifying circuit. These transistors are of the PNP type, although the NPN type transistors could also be utilized, as is known in the art. The emitter of $Q_1$ is connected to the positive terminal B of the energizing voltage $V_B$. The base of $Q_1$ is connected to ground through the parallel $C_3R_4$ precision timing circuit, feedback winding $N_6$ and emitter-collector circuit of $Q_2$. The collector of $Q_1$ is connected to ground through the main pulse output winding $N_5$. The base of $Q_2$ is connected to ground through current limiting resistor $R_{11}$, chopper control winding $N_7$ and parallel $R_{10}C_9$ biasing circuit. The signal input terminals I,I′ are connected to the integrating or low pass filter network $R_1C_2$, as shown. Terminal B is connected through main pulse transfer winding $N_8$, base collector circuit of $Q_3$ to the input terminal Q of the band pass filter comprising inductors $L_A$, $L_c$, $L_e$ and capacitors $C_B$, $C_D$ and $C_F$ connected as shown. The emitter of $Q_3$ is directly connected to terminal B and through filter capacitor $C_{11}$ to grounded terminal B′.

The four windings of the pulse transformer are wound on a small high permeability core which may be of ferrite in directions illustrated by the conventional dots. The output F-M modulated sine wave is derived from terminals O,O′ across output load $R_0$, while the modulating signals $V_m$ are applied to input terminals I,I′, terminal I′ being grounded, as shown.

In FIG. 2 are shown in cortesian coordinates four voltage wave forms as a function of time. FIG. 2A is the integrated modulating signal at the emitter junction of $Q_2$; FIG. 2B is the voltage wave form at the base of the blocking oscillator transistor $Q_1$; FIG. 2C is the oscillator output pulse at the collector of $Q_1$; and FIG. 2D shows the output sine wave across terminals O,O'.

A detailed description of the voltage controlled oscillator of the present invention will now be given. Since the mathematical analysis of the system is complex, the transistor action herein will be idealized and certain assumptions made which will lead to approximate equations relating the parameters which determine the critical variables of the circuit.

The analysis will be aided by considering the shape of the waveforms at the critical times thereof.

First, at $t_{0+}$ transistor $Q_1$ becomes quickly saturated due to the regenerated effect between windings $N_5$ and $N_6$, as is well known in the art of blocking oscillators. Therefore, $Q_1$ acts as a closed switch making its collector-emitter voltage approach zero, its collector voltage $v_c$ then reaches rapidly the energizing value $V_B$, and its collector current begins to increase toward a maximum. The current in the collector of $Q_1$ develops a positive voltage pulse:

$$\left(e=L\frac{d_i}{d_t}\right)$$

in winding $N_5$. Hence, at $t_{0+}$, $v_c$ (of $Q_1$)$=V_B$, as shown in FIG. 2c. This positive pulse in turn produces a negative going voltage pulse in windings $N_6$ and $N_7$.

The negative pulse in $N_7$ saturates chopper transistor $Q_2$, thereby making its emitter-collector voltage approach zero and allowing its base to draw a maximum current which charges biasing capacitor $C_9$ through current limiting resistor $R_{11}$.

Since the dotted terminal of winding $N_6$ becomes virtually grounded through the emitter-collector of chopper $Q_2$ at $t_{0+}$, the negative going pulse in winding $N_6$ will appear at the base of transistor $Q_1$ because the voltage across timing capacitor $C_3$ cannot change instantaneously. At $t_{0+}$, $\Delta v_b$ (of $Q_1$)$=(i_{b1})(r_{b1})$, where $i_{b1}$ is the base current and $r_{b1}$ is the non-linear base resistance. Thereafter, $C_3$ will charge to the supply voltage $V_B$ plus the voltage $V_B(N_6/N_5)$ appearing across winding $N_6$, where $N_6/N_5$ is the turns ratio between windings $N_6$ and $N_5$.

To summarize, at $t_{0+}$, voltage $V_B$ is across winding $N_5$, a negative pulse appears at the base of $Q_1$, and the emitter of chopper transistor $Q_2$ is grounded. Timing capacitor $C_3$ charges during period $T_1$ which ends at $t=T_b$ when the collector of $Q_1$ can no longer supply the current needed in winding $N_5$ in order to provide for all the required currents flowing out of the base of transistor $Q_1$ and the base of transistor $Q_2$, and for the continuously increasing core magnetizing current. Since the inductors on the ferrite core are linear, the current in $N_5$ during the main pulse interval $T_1$ increases approximately linearly with time.

For example, if the inductance $L_5$ of winding $N_5$ is such that the peak current in $N_5$ is about 7 milliamps; if $T_1$ is at 5 to 10% of $T_0$ where $T_0$ is equal to $1/F_0$ and $F_0$ is the operating center frequency of the oscillator in the absence of an input modulating voltage, and if the effective value of the non-linear base resistance $r_{b1}$ of transistor $Q_1$ is approximately equal to 1,000 ohms, then the period $T_1$ is given by the following approximate equation:

$$T_1=(r_{b1})(C_3) \qquad (1)$$

At the end of period $T_1$, i.e., at $t=T_b$, the current flowing through $N_5$ decreases since $Q_1$ can no longer supply the demand of $N_5$, and due to the regenerative action of the other windings, the collector voltage $v_c$ of $Q_1$ falls rapidly below ground potential to a value $V_D$, where $V_D$ is a base-emitter voltage drop, thereby cutting off transistor $Q_1$. Simultaneously, the negative going pulse in winding $N_5$ produces positive going pulses in windings $N_6$ and $N_7$.

The positive pulse in winding $N_7$ cuts off chopper transistor $Q_2$ which is equivalent to opening a switch across capacitor $C_2$. The positive going pulse in winding $N_6$ appears at the base of transistor $Q_1$, since again the voltage across $C_3$ cannot change instantaneously. Therefore, at $t=T_b$:

$$v_b(\text{of } Q_1)=V_B\ (1+N_6/N_5)$$

One important criterion for $T_1$ is that it be long enough to permit the timing condenser $C_3$ to be fully charged, that is, to reach a voltage equal to $V_B-V_D$ plus the voltage across $N_6$ where $V_D$ is the base-emitter voltage drop of $Q_1$. $V_D$ is similar to the voltage drop across a diode in the forward direction. Were $T_1$ not long enough to satisfy this condition, the cut-off period $T_u$ of the oscillator would still be determined by the amount of charge on $C_3$, as well as by all the other usual parameters. This condition would deteriorate the temperature stability of the modulation system.

Following the main pulse period $T_1$ of the blocking oscillator $Q_1$, the current in $Q_1$ collapses with regenerated speed. Energy stored in the core of the pulse transformer causes the voltages across the transformer windings to reverse thereby making winding $N_8$ to act as a virtual battery for a period $T_2$. During this period the voltage induced in winding $N_8$ forward biases the base emitter junction of $Q_3$ thereby causing it to draw collector current. Period $T_2$ ends when the entire energy from the core of the transformer is dissipated in the base-emitter junction of $Q_3$ across $N_8$, and in various losses.

Period $T_2$ can be modified by altering the turns ratio $N_8/N_5$, and/or by shunting an energy release diode across one or several windings, and/or by connecting across one or several windings a damping resistor. The remaining period $T_3$ of the relaxation period $T_u$ terminates at $t=T_a$ when the voltage across timing condenser $C_3$ discharges to a point low enough to cause the base of $Q_1$ to again draw forward current. Therefore, the next main pulse of the blocking oscillator occurs at the end of the relaxation period $T_u$ when the base voltage of $Q_1$ equals the emitter voltage $V_B$ minus the emitter-base voltage drop $V_D$. In accordance with this invention, the relaxation time period $T_u$ primarily depends on the time constant of the timing circuit $C_3R_4$, and the effective modulating voltage $v_i$ across capacitor $C_2$. $T_u$ depends only secondarily upon the main blocking oscillator period $T_1$. It can be shown that $T_u$ is approximately given by:

$$T_u=R_4C_3L_n\left\{\frac{1+\frac{N_6}{N_5}}{1-x}\right\} \qquad (2)$$

where:

$x=v_i/V_B$ ($v_i$ taken at the end of $T_u$),
$N_6/N_5$ is the turns ratio between windings $N_6$ and $N_5$,
$L_n$ is the natural logarithm, and $x$ is called the direct input modulation factor.

The center frequency $F_0$ is obtained by making the input voltage and, hence, $x$ equal to zero in Equation 2. Therefore:

$$T_0=1/F_0=T_1+T_u(v_i=0)=T_1+R_4C_3L_n(1+N_6/N_5) \qquad (3)$$

and the repetition period T between the main pulses of the blocking oscillator is:

$$T=T_1+T_u \qquad (4)$$

The modulating signal voltage $V_m$ is applied to the integrating or low pass filter network $R_1C_2$. As was seen previously, from $t_{0+}$ to $t=T_b$, the effective modulating voltage $v_i$ across $C_2$ is near ground potential due to the conduction of $Q_2$. At $t=T_b$, the positive pulse in winding $N_7$ cuts off transistor $Q_2$, thereby opening the switch across integration capacitor $C_2$. Since the time period T of one cycle of the blocking oscillator is generally, but not necessarily, very short compared to one period of the modulating intelligence signal, it will be hereinafter assumed that the modulating voltage $V_m$ remains constant over the relaxation period $T_u$. It should be noted that this is only a convenient assumption and is not intended to be a restriction.

Figure 2A:
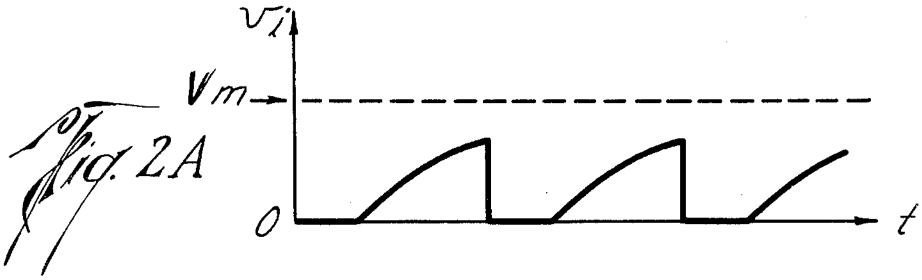
Figure 2B:
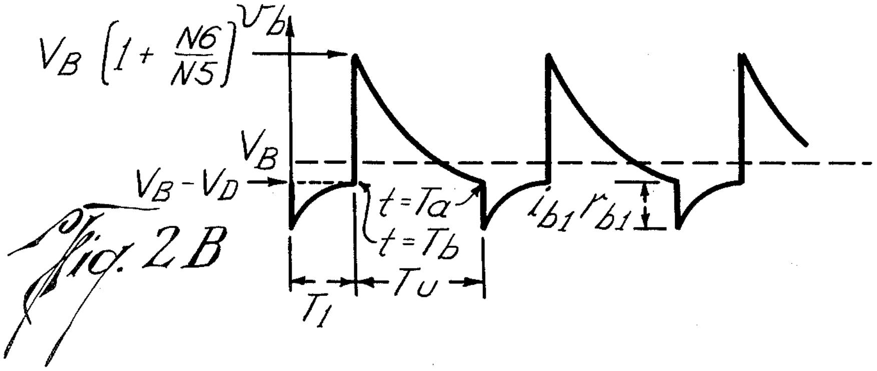
Figure 2C:
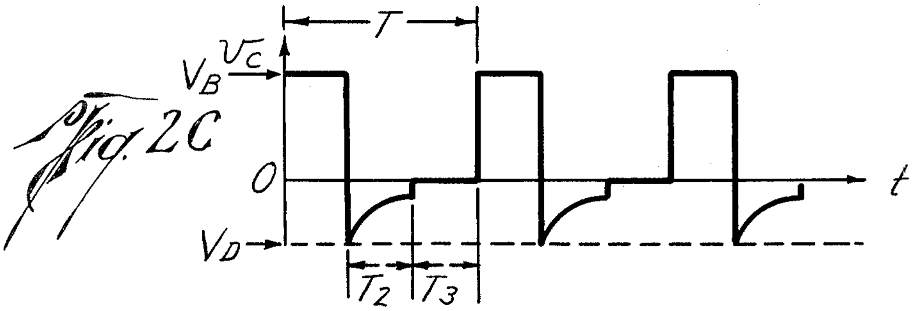

Modulating voltage $V_m$ charges condenser $C_2$ through $R_1$ up to the end of period $T_u$ to an asymptotic value equal to $V_m$, as shown in FIG. 2A. The timing network of the blocking oscillator $C_3R_4$ sitting directly on the integrated modulating signal has its discharge time determined in part by the integrated voltage on $C_2$ attained at the end of the relaxation period $T_u$.

In summary, chopper transistor $Q_2$ is closed (conducting) during $T_1$ by the voltage induced in winding $N_7$ and $Q_2$ is open (cut-off) during relaxation period $T_u$ because its base-emitter junction is reverse-biased by the voltage developed during $T_1$ on the parallel $C_9R_{10}$ network by its base current. The base resistor $R_{11}$ limits the peak base current of $Q_2$ during $T_1$.

Let $u=V_m/V_B$ where $u$ is defined as the modulation input voltage factor; then it can be mathematically shown that the interpulse period T is approximately equal to:

$$T=\frac{1}{F}=r_{b1}C_3+R_4C_3L_n\left\{\frac{1+\frac{N_6}{N_5}}{1-u\left[1-\frac{e^{-T_u}}{R_1C_2}\right]}\right\} \qquad (5)$$

It has been experimentally found that practical oscillators perform close to this relation when corrected for the transistor base emitter voltage drop $V_D$.

Examining the analysis of Equation 5 and the experimental data obtained from several oscillators, it appears that the frequncy F can be made a linear function of the input voltage $V_m$ for deviations up to ±7.5% with a maximum departure from the best straight line (BSL) of ±0.05%. The linearity for ±15% deviation of F can be held to ±0.1% BSL. The sensitivity of the circuit is excellent. It was found that a five volt signal $V_m$ causes well over ±7.5% deviation when the ratio $N_6/N_5$ is equal to one-half. In order to limit the sensitivity of the voltage controlled oscillator, a shunting resistor may be connected across integrating capacitor $C_2$.

The sine wave output signal is obtained across output terminals O,O′ of the band pass filter. Energy is stored in the core of the pulse transformer during the main pulse period $T_1$ and is released to the base emitter junction of the output pulse transistor amplifier $Q_3$ during the interval $T_2$. The amplified output of $Q_3$ functions as a time variable current source driving the band pass output filter.

Figure 2D:
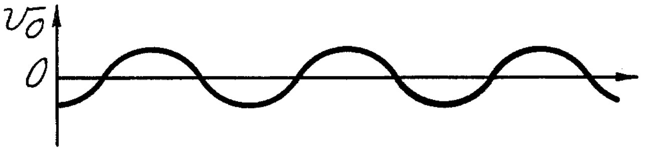

The band pass filter is typically terminated in a 5,000 ohm load $R_0$ either internal or external to the voltage controlled oscillator. It produces a pure sub-carrier sine wave, as shown in FIG. 2D, whose frequency corresponds to the interpulse frequency of the blocking oscillator. The available sine wave output voltage across terminals O,O′ is three to five volts R.M.S. with less than 1% sub-carrier distortion at any point in the designed channel when the system operates from a nine volt power source $V_B$ with a 40 milliwatt drain. Intelligence signals deviating the sub-carrier sine wave by ±7.5% of center frequency at the rate corresponding to a modulation index of 5 are distorted less than 1% as a consequence of the wide pass band and linear phase characteristics of the filter. The amplitude of the sub-carrier level changes less than ±1 db across the designed channel.

The output circuit is so completely isolated from the frequency determining section that the mixing of the output signals from a number of oscillators may be accomplished in simple resistors to drive a sub-carrier multiplex line, transmitter or recorder, etc. Since the output level of each VCO is three to five volts R.M.S. and the total load is 5,000 ohms, this summing line can generally provide about 1.0 volt R.M.S. sub-carrier multiplex signals at a source impedance of 1,000 ohms or less.

When the elements of the filter are arranged as shown in FIG. 1 and are such that the characteristic impedance of the L, C sections increases as one progresses from $L_AC_B$ through $L_cC_D$ to $L_eC_f$ toward the output load, then the low impedance time variable source $Q_3$ appears essentially under pulse operations as a current source thereby eliminating the need for matching resistors which would reduce the overall power efficiency and increase the weight of the subminiature VCO. This is an especially useful property for the circuit in accordance with my invention, since the input of the filter can be driven directly from a switch type transistor such as $Q_3$. The resulting output wave has a relatively high voltage level even at low impedance with good power supply efficiency (15% or better in some cases). For example, when $F_0$=5030 c.p.s. and $R_0$=3170 ohms, the values for the L's and C's should be approximately selected as follows:

$L_A$=4.1 milli-henries
$C_B$=.29 micro-farad
$L_c$=24 milli-henries
$C_D$=.0465 micro-farad
$L_e$=74.7 milli-henries
$C_F$=.011 micro-farad The voltage controlled oscillator, in accordance with this invention, is particularly suitable for the transmission of pulses rich in harmonic content. Since the pulse response of the circuit is sufficiently damped, it does not appreciably ring or overshoot. It was found that the rise time is about 0.6 the total period of one sub-carrier cycle for a VCO operating at ±15% deviation.

The choice of circuit elements employed in the system in FIG. 1 is subject to wide variation. Merely to exemplify the practice of the invention and not in restriction of its scope, the following set of values is given for some of the frequency determining components.

| | |
|---|---|
| Transistors $Q_1$, $Q_2$ and $Q_3$ | Philco type 2N495 or 2N496. |
| $R_1$, $R_4$, $R_{11}$ and $R_{10}$ | 470k, 33k, 1k and 5k, respectively. |
| $C_{11}$ and $C_9$ | 1.0 micro-farad. |
| $V_b$ | 9 volts. |
| $r_{b1}$ | 1,000 ohms. |
| $N_8/N_5$ | 1 (one). |
| $V_B/V_D$ and $T_2/T_1$ | 8. |
| $N_6/N_5$ and $N_7/N_5$ | One-half. |
| $R_4C_3/R_1C_2$ | Generally between 1 and 2. |

In summary, certain salient features of the circuit of this invention will be outlined infra.

It was found that even though Equation 5 in column 5 is apparently a non-linear function, the frequency deviation (or pulse period deviation) can be made a linear function of an input voltage or current over a wide range (±15% of basic period) by suitably selecting time constants $R_1C_2$ and $R_4C_3$.

Also, the use of linear inductors in the pulse transformer and in the filter to alternately store and release energy produces a substantial output power with better power supply efficiency than that obtainable in the prior art systems of this character.

This is in part due to the concept of storing energy in the core of the pulse transformer during interval $T_1$ at a relatively high voltage, and releasing it over a relatively long period $T_2$ at a lower voltage.

The excellent isolation between the output load (including the band pass filter) and the precision time or frequency determining element is obtained, in accordance with this invention, by disconnecting the output load during $T_1$ from the components producing the main pulse. The load is driven only during period $T_2$ (the base emitter junction of $Q_3$ is biased off during $T_1$) when the pulse circuitry is not required to perform a precise time function. Thus, excellent isolation is obtained on a time sharing basis with a minimum number of components.

The circuit is also well isolated from the input load across terminals I,I′. A change in input impedance from short to open circuit causes less than ±2/7% in output frequency.

The invention is susceptible to certain modifications which will readily suggest themselves to the man skilled in the art.

For example, to make T a linear function of $V_m$ the integrating network $R_1C_2$ may be replaced by a network which would transform the incoming intelligence signals $V_m$ into an input modulating voltage $v_1$ as a function of $V_m$ capable of biasing the return voltage of $N_6$ during $T_u$. This network should preferably have an impedance, just prior to the decision instant when $t=T_a$ in FIG. 2B, in the order of 1,000 ohms or less at a frequency of about 30 times greater than the pulse repetition frequency.

Also an alternative relaxation oscillator may be used with the same input configuration consisting primarily of $C_3R_4$, $N_6$, $Q_2$ and $R_1C_2$. Also, for some applications it is often desirable to make $T_1$ approximately equal to $T_u$, i.e., to obtain a square wave oscillator. This may be readily accomplished by a mere change in the value of the components shown in FIG. 1.

Other components which may be added in order to linearize the frequency or interpulse period deviation function of the VCO include an inductor in series with $R_1$ and/or an RC time constant inserted in series with the emitter or $Q_1$.

It should be understood that the output signal need not be taken from terminals O,O′. The circuit may be made to function as a pulse generator with a linearity variable interpulse period by deriving the output from terminals P,P′ across $N_8$ ($Q_3$ and the filter being omitted), or from terminals Q,Q′ (the filter being omitted).

The circuit as shown in FIG. 1 can be housed in a box not bigger than 3.4 cubic inches. The weight of the entirely assembled VCO can be made less than 5 ounces. The unit is extremely reliable from −55° C. to +125° C. A change in center frequency of less than 3/7% from its corresponding value at +25° C. results over a temperature range of −25° C. to +100° C.; the bandwidth being stable within 3% over the same temperature range.

Vibration in three mutually perpendicular planes at 20 g. acceleration up to a frequency of 2,000 c.p.s. results in a frequency variation of less than 1% of full bandwidth.

The unit is also very stable at high altitude: a change from three atmospheres to 100,000 feet produces less than ±1% variation in center frequency and bandwidth. The VCO is also unaffected by relative humidity of up to 100% when a hermetic box is employed.

Although this invention has been described with respect to preferred specific embodiments thereof, it is not to be so limited since changes and modifications may be made therein which are within the full intended scope of this invention, as defined by the appended claims.

What is claimed is:

1. A frequency modulator comprising a blocking oscillator, a parallel resistance-capacitance timing network for determining the length of the periodically alternating "on" periods and "off" periods of said oscillator, a main winding in the output circuit of said oscillator, a feedback winding coupled to said main winding and connected to said timing network, a control winding coupled to said main winding, a source of modulating signals, integrating means for integrating said modulating signals, and chopper means being connected in parallel with said integrating means and being energized by said control winding for transferring said signals from said source to said feedback winding during said "off" periods and for short circuiting said integrating means during said "on" periods.

2. A frequency modulator comprising a blocking oscillator, said oscillator including a semi-conductor device having an emitter, a base and a collector; a pulse transformer having a main winding, a feedback winding and a control winding mounted on a high permeability core, said main winding being connected to said collector; a parallel resistance-capacitance timing network connected between said feedback winding and said base, a source of input intelligence signals, an integrator for integrating said intelligence signals, a semi-conductor chopper having an emitter, a base and a collector; means for connecting said emitter and said collector of said chopper across said integrator, and means for connecting said control winding to said base of said chopper.

References Cited by the Examiner

UNITED STATES PATENTS

| | | | |
|---|---|---|---|
| 2,777,092 | 1/1957 | Mandelkorn | 307—88.5 |
| 2,852,746 | 9/1958 | Scheele | 332—16 |
| 2,870,421 | 1/1959 | Goodrich | 332—16 X |
| 2,902,655 | 9/1959 | Jones et al. | 331—112 |
| 2,902,656 | 9/1959 | Soffel | 332—27 X |
| 2,906,893 | 9/1959 | Mattson | 307—88.5 |
| 2,919,437 | 12/1959 | Buie et al. | 332—29 X |
| 2,924,786 | 2/1960 | Talkin et al. | 331—112 |
| 2,965,770 | 12/1960 | Lewinter | 307—88.5 |
| 3,012,207 | 12/1961 | Silverberg | 332—27 X |
| 3,067,393 | 12/1962 | Murray | 332—14 |
| 3,129,595 | 6/1964 | Barber | 332—12 |
| 3,146,408 | 8/1964 | Nissim et al. | 332—14 X |

ROY LAKE, *Primary Examiner.*

ARTHUR GAUSS, *Examiner.*

L. MILLER ANDRUS, BENNETT G. MILLER, A. L. BRODY, *Assistant Examiners.*